(12) United States Patent
Salter et al.

(10) Patent No.: US 11,904,947 B2
(45) Date of Patent: Feb. 20, 2024

(54) DEPLOYABLE SPLASH GUARD SYSTEMS FOR MOTOR VEHICLES

(71) Applicant: FORD GLOBAL TECHNOLOGIES, LLC, Dearborn, MI (US)

(72) Inventors: Stuart C. Salter, White Lake, MI (US); Jeffrey Robert Seaman, Brownstown, MI (US); Annette Lynn Huebner, Highland, MI (US); David Brian Glickman, Southfield, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/729,389

(22) Filed: Apr. 26, 2022

(65) Prior Publication Data

US 2023/0339547 A1  Oct. 26, 2023

(51) Int. Cl.
  *B62D 25/18*  (2006.01)
(52) U.S. Cl.
  CPC .................................. *B62D 25/182* (2013.01)
(58) Field of Classification Search
  None
  See application file for complete search history.

(56) References Cited

U.S. PATENT DOCUMENTS

| | | | | |
|---|---|---|---|---|
| 6,007,102 A * | 12/1999 | Helmus | ................ | B62D 25/182 280/847 |
| 8,066,304 B2 * | 11/2011 | Ulgen | ................. | B62D 25/182 280/847 |
| 8,260,519 B2 * | 9/2012 | Canfield | ................ | B62D 35/00 701/74 |
| 9,102,363 B2 | 8/2015 | Atkinson et al. | | |
| 10,093,361 B2 * | 10/2018 | Wilson | ................. | B62D 25/182 |
| 11,001,316 B2 * | 5/2021 | Kim | ........................ | B62D 37/02 |
| 2008/0100071 A1 * | 5/2008 | Browne | ............... | B62D 25/182 292/341.17 |
| 2009/0273176 A1 * | 11/2009 | Ulgen | .................. | B62D 25/182 280/851 |

(Continued)

FOREIGN PATENT DOCUMENTS

| | | | |
|---|---|---|---|
| CN | 107804378 A | | 3/2018 |
| CZ | 202080 A3 * | | 8/2021 |

(Continued)

OTHER PUBLICATIONS

Translated DE-102016115080-A1 (Year: 2023).*

*Primary Examiner* — James A Shriver, II
*Assistant Examiner* — Ian Bryce Shelton
(74) *Attorney, Agent, or Firm* — Vichit Chea; Carlson, Gaskey & Olds, P.C.

(57) ABSTRACT

Exemplary deployable splash guard systems for motor vehicles may include features designed for blocking road spray. The deployable splash guard systems may include a flap that is movable between a stowed position and a deployed position for blocking the road spray. In the deployed position, the flap is positioned within a spray field of a tire of the motor vehicle and is therefore positioned to block the road spray from spraying onto a door handle and/or other structures of the motor vehicle. A control module of the deployable splash guard system may be programmed to utilize a sensor weighting scheme for accurately determining when to deploy the flap.

15 Claims, 4 Drawing Sheets

(56) References Cited

U.S. PATENT DOCUMENTS

| | | | | |
|---|---|---|---|---|
| 2009/0289446 A1* | 11/2009 | Proctor | ................ | B62D 25/182 |
| | | | | 280/847 |
| 2012/0112447 A1* | 5/2012 | Stidsen | ................ | B62D 25/188 |
| | | | | 280/851 |
| 2015/0014976 A1* | 1/2015 | Atkinson | ............. | B62D 25/182 |
| | | | | 280/848 |
| 2015/0151794 A1* | 6/2015 | Gray | .................... | B62D 25/163 |
| | | | | 280/848 |
| 2015/0274214 A1* | 10/2015 | Riddick | ............... | B62D 25/182 |
| | | | | 29/434 |
| 2018/0127039 A1* | 5/2018 | Freytag | ................ | B62D 25/166 |
| 2018/0251161 A1* | 9/2018 | Wilson | ................. | B62D 25/182 |
| 2019/0118874 A1* | 4/2019 | Ibañez Moreira | ..... | B62D 35/02 |
| 2020/0130756 A1* | 4/2020 | Kim | ....................... | B62D 35/02 |

FOREIGN PATENT DOCUMENTS

| | | | |
|---|---|---|---|
| CZ | 202081 A3 * | 8/2021 | |
| CZ | 202082 A3 * | 8/2021 | |
| DE | 102016115080 A1 * | 2/2018 | |
| DE | 102016115080 A1 | 2/2018 | |
| DE | 102019102641 A1 * | 8/2020 | |
| EP | 2982576 A1 * | 2/2016 | |
| EP | 3260359 B1 | 4/2019 | |
| FR | 2798110 A1 * | 3/2001 | |

* cited by examiner

DEPLOYABLE SPLASH GUARD SYSTEMS FOR MOTOR VEHICLES

TECHNICAL FIELD

This disclosure relates generally to motor vehicles, and more particularly to deployable splash guard systems for blocking road spray during various vehicle operating conditions.

BACKGROUND

During vehicle motion, tires of the vehicle rotate and can cause road spray to be kicked up, pushed out, and/or sprayed out from the tires. The road spray can be propelled onto the side body of the vehicle, thereby causing an aesthetic appearance that may be displeasing to the vehicle owner.

SUMMARY

A deployable splash guard system for a motor vehicle according to an exemplary aspect of the present disclosure includes, among other things, a flap, and an actuator configured to rotate the flap between a stowed position and a deployed position. In the deployed position, the flap is positioned within a spray field of a tire of the motor vehicle. A door handle of the motor vehicle is blocked by the flap when the flap is in the deployed position.

In a further non-limiting embodiment of the foregoing deployable splash guard system, the flap includes a front face that exhibits an aerodynamic sweep.

In a further non-limiting embodiment of either of the foregoing deployable splash guard systems, the flap includes a front face having a plurality of ridges.

In a further non-limiting embodiment of any of the forgoing deployable splash guard systems, the actuator is an electric motor that includes a gearbox and a drive shaft operably coupled to the gearbox. The drive shaft is configured to rotate the flap about a pivot axis.

In a further non-limiting embodiment of any of the forgoing deployable splash guard systems, the actuator is mounted to an inner surface of a wheel lip of the motor vehicle.

In a further non-limiting embodiment of any of the forgoing deployable splash guard systems, the actuator is mounted to an apron of a fender of the motor vehicle.

In a further non-limiting embodiment of any of the forgoing deployable splash guard systems, the system includes a sensor system and a control module operably connected to the sensor system. The control module is programmed to command the actuator to rotate flap based on sensor data from the sensor system.

In a further non-limiting embodiment of any of the forgoing deployable splash guard systems, the control module is further programmed to analyze the sensor data using a weighting scheme.

In a further non-limiting embodiment of any of the forgoing deployable splash guard systems, the flap includes a curvature that is shaped to match a curvature of a wheel lip of the motor vehicle.

In a further non-limiting embodiment of any of the forgoing deployable splash guard systems, the flap includes a curvature that is shaped to match a curvature of an apron of a fender of the motor vehicle.

A deployable splash guard system for a motor vehicle according to another exemplary aspect of the present disclosure includes, among other things, a flap, a sensor system, and a control module programmed to analyze sensor data from the sensor system based on a weighting scheme for determining when to command deployment of the flap between a stowed position and a deployed position.

In a further non-limiting embodiment of the foregoing deployable splash guard system, in the deployed position, the flap is positioned within a spray field of a tire of the motor vehicle and is therefore positioned to block a door handle of the motor vehicle from road spray.

In a further non-limiting embodiment of either of the foregoing deployable splash guard systems, the control module is further programmed to command the deployment of the flap when a sum of weighted factors derived from the weighting scheme exceeds a predefined value.

In a further non-limiting embodiment of any of the foregoing deployable splash guard systems, an actuator is configured to rotate the flap between the stowed position and the deployed position.

In a further non-limiting embodiment of any of the foregoing deployable splash guard systems, the actuator is an electric motor that includes a gearbox and a drive shaft operably coupled to the gearbox. The drive shaft is configured to rotate the flap about a pivot axis.

In a further non-limiting embodiment of any of the foregoing deployable splash guard systems, the actuator is mounted to an inner surface of a wheel lip of the motor vehicle.

In a further non-limiting embodiment of any of the foregoing deployable splash guard systems, the wheel lip is mounted to a fender of the motor vehicle and at least partially envelops a tire of the motor vehicle.

In a further non-limiting embodiment of any of the foregoing deployable splash guard systems, the flap is curved to match a curvature of the inner surface of the wheel lip.

In a further non-limiting embodiment of any of the foregoing deployable splash guard systems, the flap includes a front face that exhibits an aerodynamic sweep.

In a further non-limiting embodiment of any of the foregoing deployable splash guard systems, the flap includes a front face having a plurality of ridges.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary deployable splash guard systems for motor vehicles. Exemplary deployable splash guard systems may include a flap that is movable between a stowed position and a deployed position. In the deployed position, the flap is positioned within a spray field of a tire of the motor vehicle and is therefore positioned to block road spray from spraying onto a door handle and/or other structures of the motor vehicle. A control module of the deployable splash guard system may be programmed to utilize a sensor weighting scheme for accurately determining when to deploy the flap. These and other features of this disclosure are described in greater detail below.

Figure 1:
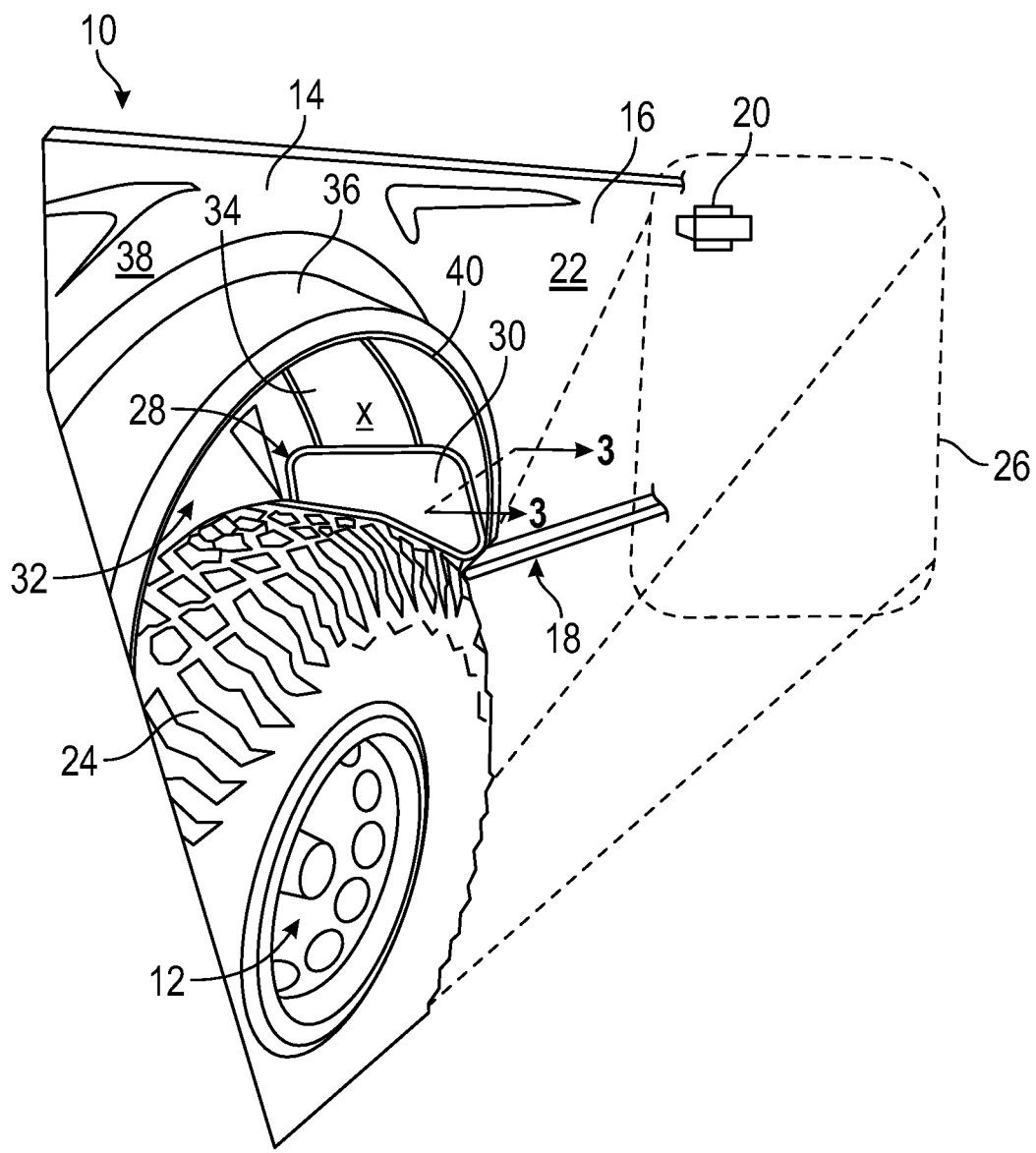
FIG. 1 illustrates portions of a motor vehicle equipped with a deployable splash guard system. The deployable splash guard system is shown in a stowed position in FIG. 1.
Figure 2:
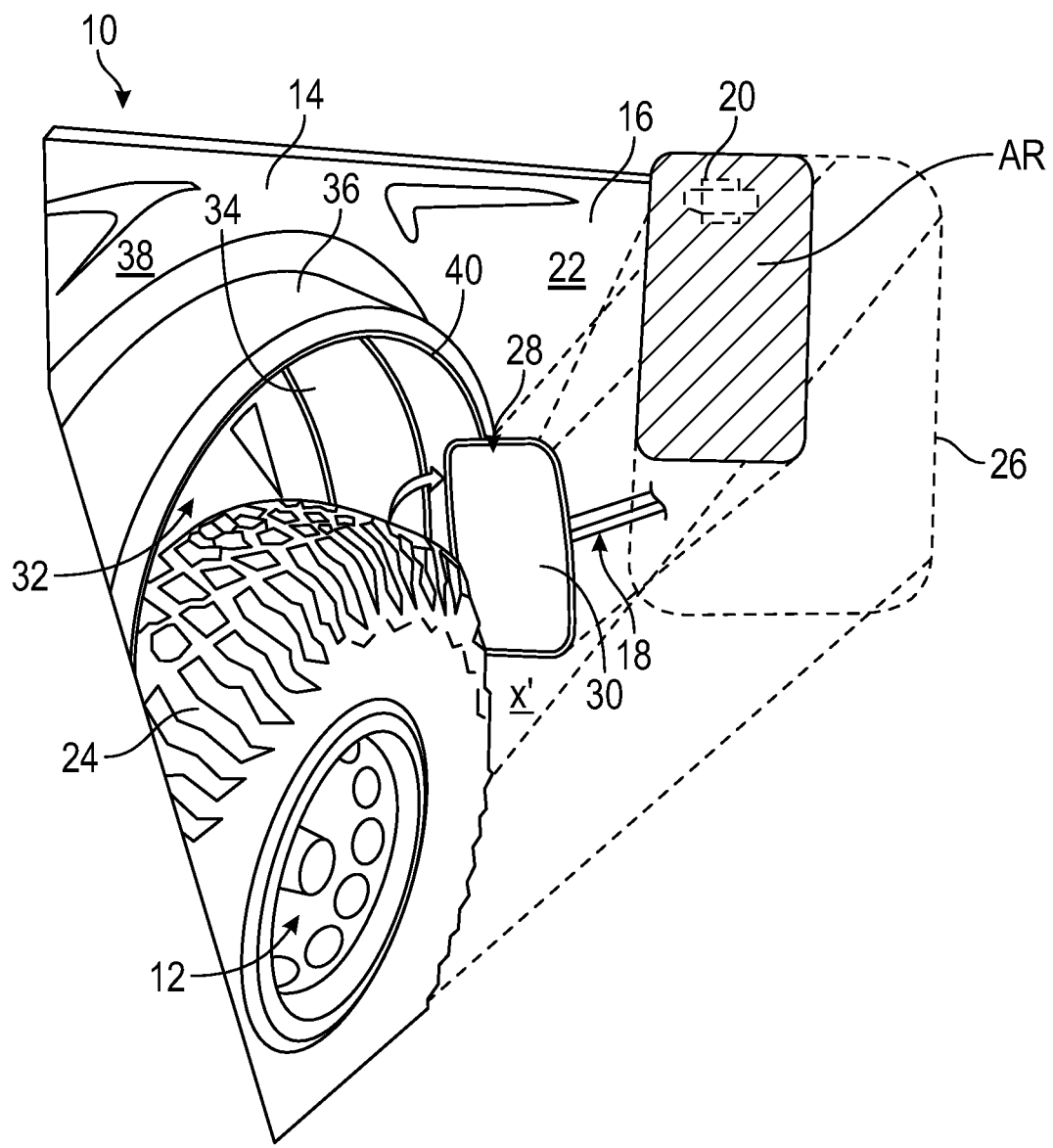
FIG. 2 illustrates a deployed position of the deployable splash guard system of FIG. 1.
Figure 3:
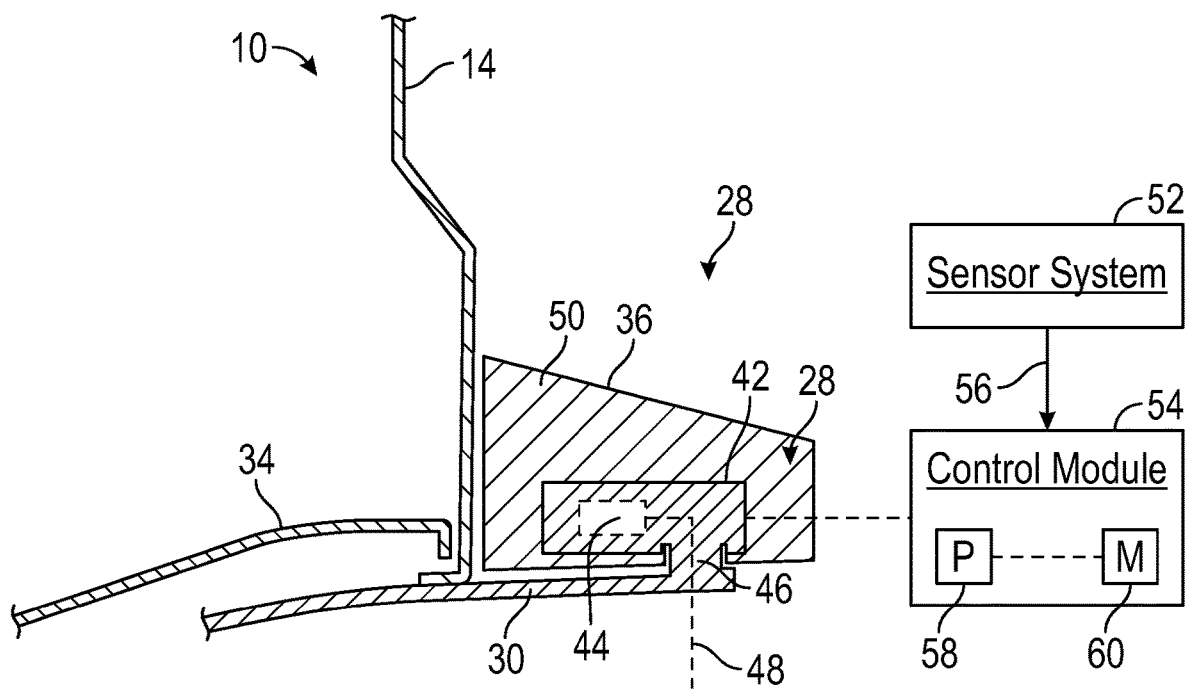
FIG. 3 is a cross-sectional view of the deployable splash guard system of FIG. 1.

FIGS. 1, 2, and 3 illustrate select portions of a motor vehicle 10 (hereinafter referred to simply as "the vehicle"). In an embodiment, the vehicle 10 is a sport utility vehicle (SUV). However, the vehicle 10 could alternatively be configured as a car, a truck, a van, or any other type of vehicle within the scope of this disclosure. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to better emphasize certain details of a particular component or system.

The vehicle 10 may include a front wheel 12, a fender 14, and a side door 16. In the illustrated embodiment, the front wheel 12, the fender 14, and the side door 16 are located on a driver side 18 of the vehicle 10. An additional front wheel, fender, and side door (not shown in FIGS. 1-3) may be located on a passenger side of the vehicle 10 and could include similar designs as the front wheel 12, the fender 14, and the side door 16 of the driver side 18. Furthermore, although not specifically shown, the vehicle 10 could include features such as rear side doors and rear wheels for providing a four-door, four-wheel vehicle.

The side door 16 is movable between closed and open positions for gaining ingress into or egress from an interior passenger cabin of the vehicle 10. The side door 16 may include a door handle 20 that is secured at an exterior surface 22 of the side door 16. The door handle 20 may be configured for allowing users to unlatch the side door 16 and push/pull the side door 16 between the closed and open positions.

The front wheel 12 may include a tire 24. The tire 24 provides traction relative to a surface over which the front wheel 12 travels. As the tire 24 rotates during movement of the vehicle 10, road spray may be kicked up, pushed out, and/or sprayed out from the tire 24. The road spray may include water, mud, sand, dust, debris, etc., or combinations thereof. During vehicle movement, the road spray may be projected within a spray field 26 that extends rearwardly from the tire 24.

Portions of the vehicle 10, including but not limited to portions of the exterior surface 22 of the side door 16 and the door handle 20, may be located within the spray field 26. In some situations, the road spray could impinge upon the exterior surface 22 and/or the door handle 20, thereby resulting in an aesthetic appearance that is often displeasing to the user/owner of the vehicle 10. This disclosure therefore contemplates deployable splash guard systems 28 that are designed for blocking the road spray and therefore substantially preventing the road spray from intruding upon the door handle 20 and/or other portions of the exterior surface 22. The door handle 20 and the exterior surface 22 may therefore be maintained cleaner, thereby resulting in an aesthetic appearance that is more pleasing to the user/owner of the vehicle 10.

The exemplary deployable splash guard system 28 may be transitioned between a stowed position X (shown in FIG. 1) and a deployed position X' (shown in FIG. 2). In the stowed position X, a flap 30 of the deployable splash guard system 28 is substantially positioned within a wheel well 32 of the vehicle 10 and is therefore inboard of an outer profile of the vehicle 10. The wheel well 32 may include an apron 34 that may be established by inner surfaces of the fender 14 and a wheel lip 36 that may be secured to the fender 14. The flap 30 is not positioned within the spray field 26 when in the stowed position X.

In the deployed position X', the flap 30 is moved (e.g., rotated) to a location outside of the wheel well 32. At least a portion of the deployed flap 30 extends outboard of the outer profile of the vehicle 10, and the flap 30 is thus positioned within the spray field 26 when in the deployed position X'. In an embodiment, the flap 30 extends laterally outward (e.g., outboard) of an exterior surface 38 of the fender 14 when in the deployed position X'. In another embodiment, the flap 30 extends laterally outward (e.g., outboard) of an outboard edge 40 of the wheel lip 36 when in the deployed position X'.

The flap 30 may shield an area AR (see FIG. 2) of the spray field 26 when it is moved to the deployed position X'. The flap 30 may thus function as a shield for blocking the road spray from impinging on structures located within the spray field 26, such as the door handle 20 and portions of the exterior surface 22, for example. The door handle 20 and portions of the exterior surface 22 may therefore be kept clean during vehicle operation for providing a more aesthetically pleasing appearance to the owner/user of the vehicle 10.

Referring now primarily to FIG. 3, with continued reference to FIGS. 1-2, the deployable splash guard system 28 may include an actuator 42 for powering the movement of the flap 30 between the stowed position X of FIG. 1 and the deployed position X' of FIG. 2. The actuator 42 is configured to rotate the flap 30 between the stowed position X and the deployed position X'. The total angular range of motion of the flap 30 may vary and could be dependent on various design criteria.

In an embodiment, the deployed position X' of the flap 30 is displaced between about 90° and about 180° from the stowed position X. In another embodiment, the deployed position X' of the flap 30 is displaced by about 90° from the stowed position X. In another embodiment, the deployed position X' of the flap 30 is displaced by about 135° from the stowed position X. In yet another embodiment, the deployed position X' of the flap 30 is displaced by about 180° from the stowed position X. In this disclosure, the term "about" means that the expressed quantities or ranges need not be exact but may be approximated and/or larger or smaller, reflecting acceptable tolerances, conversion factors, measurement error, etc.

In an embodiment, the actuator 42 is an electric motor that includes a gearbox 44 and a drive shaft 46. The gearbox 44 may be configured as a right angle drive unit of the actuator. The gearbox 44 may house a worm drive (not shown) that includes a worm wheel and a worm that function together to rotate the drive shaft 46. The gearbox 44 may alternatively house a planetary gear set. However, other gearbox configurations are further contemplated as within the scope of this disclosure.

The actuator 42 may be selectively powered (e.g., via a power source of the vehicle 10) to rotate the drive shaft 46, which may be connected to the flap 30. The drive shaft 46 may establish a pivot axis 48 about which the flap 30 may rotate when moving between the stowed position X and the deployed position X'.

Figure 4:
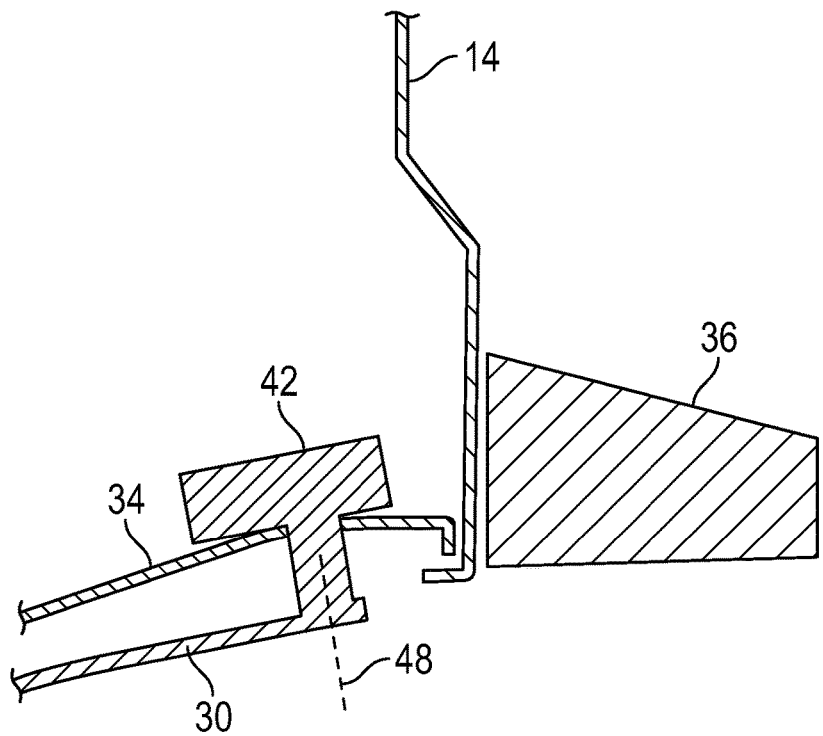
FIG. 4 illustrates a mounting configuration of an actuator of a deployable splash guard system.

The actuator 42 may be mounted to an inner surface 50 of the wheel lip 36. The inner surface 50 faces toward the tire 24. Alternatively, the actuator 42 may be mounted to the apron 34 of the fender 14 (see, e.g., FIG. 4).

The deployable splash guard system 28 may further include a sensor system 52 and a control module 54 that are operably connected to one another. The sensor system 52 may include various sensors and other components (e.g., cameras, etc.) that are capable of monitoring the environment in and around the vehicle 10, such as for inferring when conditions may be ripe for the prevalence of road spray. For example, the sensor system 52 may include one or more of vehicle speed sensors, GPS sensors, forward, side, and rear view cameras (such as part of a 360 degree camera system, for example), capacitive sensors (such as those found in entry keypad and door handles, for example), windshield rain sensors, weather forecast devices, radar sensors, steering sensors, wheel slippage sensors, height sensors, and/or various other sensors and components.

The sensor system 52 may include predictive sensors, reactive sensors, or both. Predictive sensors may analyze the environment around the vehicle 10 in order to determine whether water, mud, debris, etc. is present on the roadway that could potentially splash up on the door handle 20 and/or the exterior surface 22 of the vehicle 10. Reactive sensors may detect specific conditions that may warrant deployment of the flap 30 of the deployable splash guard system 28 (e.g., moisture on the windshield, etc.).

The sensor system 52 described above is intended to be exemplary only and thus could include a greater or fewer number of sensors and different types of sensors than have been mentioned. In addition, in this disclosure, any of the described sensors of the sensor system 52 could be configured as a single sensor or an arrangement of sensors or sensing devices adapted for a specific purpose(s).

The sensor system 52 may be configured to communicate sensor data 56 to the control module 54. As further explained below, the sensor data 56 may be analyzed by the control module 54 for determining when to deploy the flap 30 of the deployable splash guard system 28.

Although schematically illustrated as a single controller, the control module 54 may be part of a vehicle control system that includes a plurality of additional control modules for interfacing with and commanding operation of the various components of the vehicle 10. In an embodiment, the control module 54 is part of a body control module (BCM) of the vehicle 10. However, other configurations are also contemplated.

The control module 54 may be equipped with executable instructions for interfacing with and commanding operation of various components of the vehicle 10, including but not limited to, the actuator 42 of the deployable splash guard system 28. The control module 54 may include a processing unit 58 and non-transitory memory 60 for executing the various control strategies and modes of the deployable splash guard system 28. The processing unit 58 can be programmed to execute one or more programs stored in the memory 60. Each program may be stored in the memory 60 as software code, for example. Each program stored in the memory 60 may include an ordered list of executable instructions for implementing logical functions associated with the deployable splash guard system 28. The processing unit 58 can be a custom made or commercially available processor, a central processing unit (CPU), or generally any device for executing software instructions. The memory 60 can include any one or combination of volatile memory elements and/or nonvolatile memory elements.

In an embodiment, the control module 54 may be programmed to command that the flap 30 be transitioned from the stowed position X to the deployed position X', or vice versa, in response to receiving and analyzing the sensor data 56 from the sensor system 52. The control module 54 may be programmed to command deployment of the flap 30 in response to a specific event or vehicle condition. For example, the control module 54 may automatically command the actuator 42 to deploy the flap 30 when the speed of the vehicle 10 exceeds a predefined value. In another embodiment, the control module 54 may automatically command the actuator 42 to deploy the flap 30 during off-roading conditions of the vehicle 10. In another embodiment, the control module 54 may automatically command the actuator 42 to deploy the flap 30 when GPS data indicates the vehicle 10 is operating on non-paved surfaces. In another embodiment, the control module 54 may automatically command the actuator 42 to deploy the flap 30 when moisture is detected on a surface of the vehicle 10 or when cameras of the sensor system 52 detect moisture, mud, debris, etc. in the pathway ahead of the vehicle 10. In another embodiment, the control module 54 may automatically command the actuator 42 to deploy the flap 30 in response to a wheel slippage condition. In yet another embodiment, the control module 54 may automatically command the actuator 42 to deploy the flap 30 in response to a user prompt. The foregoing examples are intended as non-limiting, and it should be appreciated that the control module 54 could be programmed to trigger deployment of the flap 30 in response to various other vehicle conditions.

In another embodiment, the control module 54 may be programmed to utilize a weighting scheme to analyze the sensor data 56 received from the sensor system 52 for determining when to trigger the deployable splash guard system 28. For example, each sensor of the sensor system 52 may be assigned its own unique weighting factor that indicates how much weight the data received from that particular sensor will be relied on for determining when to trigger deployment of the flap 30. The weighting factors may be pre-programmed and could, in some implementations, be adjusted by the vehicle user to suit his/her needs. If assigned a higher weighting factor, the control module 54 may give greater weight to the sensor data from a particular sensor as part of the triggering methodology, and if assigned a lower weighting factor, the control module 54 may give less weight to the sensor data of a particular sensor as part of the triggering methodology.

The control module 54 may periodically sum the various weighting factors as the sensor data 56 is received from the sensor system 52. When the summed weighting factors exceed a predefined value, thus indicating that the various conditions indicate the likelihood for road spray, the control module 54 may automatically command the actuator 42 to rotate the flap 30 to the deployed position X'.

Figure 5:
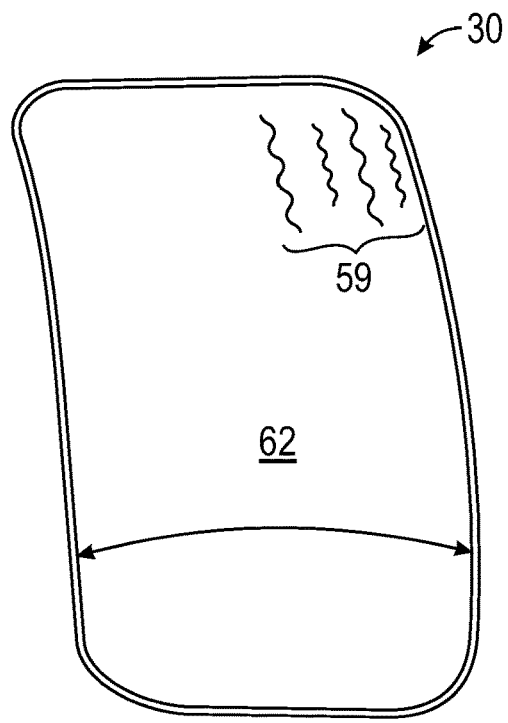
FIG. 5 is a front view of a flap of a deployable splash guard system.
Figure 6:
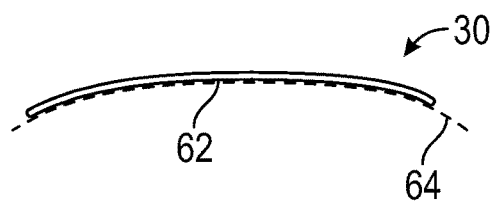
FIG. 6 is a top view of the flap of FIG. 5.
Figure 7:
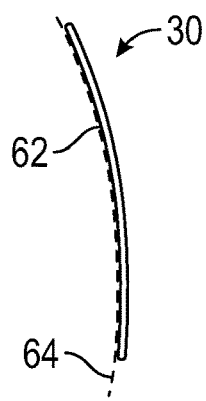
FIG. 7 is a side view of the flap of FIG. 5.

The flap 30 of the deployable splash guard system 28 is further illustrated with reference to FIGS. 5, 6, and 7 (with continued reference to FIGS. 1-3). In some implementations, the flap 30 may optionally include a plurality of ridges 59. The ridges 59 are configured to slow the velocity and energy of the road spray and further to reduce the splash pattern of the road spray, thereby maintaining cleaner aesthetic on the door handle 20 and/or the exterior surface 22 of the vehicle 10.

The ridges 59 may be arranged in an alternating pattern of shallow and deep ridges. The ridges 59 may be either localized or provided over an entire front face 62 of the flap 30. The front face 62 faces in a direction toward the front wheel 12 and therefore is the portion of the flap 30 that is adapted to block the road spray.

The front face 62 of the flap 30 may be curved to establish a compound aerodynamic sweep 64. The curvature of the aerodynamic sweep 64 may be designed to match a curvature of the apron 34. In this way, the flap 30 can stow and deploy without compromising the tire envelope in either position.

The deployable splash guard systems of this disclosure are designed to automatically deploy when certain conditions are met. Deployment of the splash guard system flap maintains desired portions of the vehicle relatively clean from the road spray while the vehicle is moving, thereby improving customer satisfaction. The proposed systems are relatively simple to implement and can be accurately deployed by leveraging sensor weighting schemes.

Although the different non-limiting embodiments are illustrated as having specific components or steps, the embodiments of this disclosure are not limited to those particular combinations. Some of the components or features from any of the non-limiting embodiments may be used in combination with features or components from any of the other non-limiting embodiments.

It should be understood that like reference numerals identify corresponding or similar elements throughout the several drawings. Although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A deployable splash guard system for a motor vehicle, comprising:
a flap; and
an actuator configured to rotate the flap between a stowed position and a deployed position,
wherein, in the deployed position, the flap is positioned within a spray field of a tire of the motor vehicle,
wherein a door handle of the motor vehicle is blocked from road spray by the flap when the flap is in the deployed position,
wherein the actuator is mounted to an inner surface of a wheel lip of the motor vehicle, and further wherein the flap is curved to match a curvature of the inner surface of the wheel lip.

2. The deployable splash guard system as recited in claim 1, wherein the flap includes a front face that exhibits an aerodynamic sweep.

3. The deployable splash guard system as recited in claim 1, wherein the flap includes a front face having a plurality of ridges.

4. A deployable splash guard system for a motor vehicle, comprising:
a flap; and
an actuator configured to rotate the flap between a stowed position and a deployed position,
wherein, in the deployed position, the flap is positioned within a spray field of a tire of the motor vehicle,
wherein a door handle of the motor vehicle is blocked by the flap when the flap is in the deployed position,
wherein the actuator is an electric motor that includes a gearbox and a drive shaft operably coupled to the gearbox, and further wherein the drive shaft is configured to rotate the flap about a pivot axis.

5. The deployable splash guard system as recited in claim 1, comprising a sensor system and a control module operably connected to the sensor system, wherein the control module is programmed to command the actuator to rotate flap based on sensor data from the sensor system, wherein the control module is further programmed to analyze the sensor data using a weighting scheme.

6. A deployable splash guard system for a motor vehicle, comprising:
a flap;
a sensor system; and
a control module programmed to analyze sensor data from the sensor system based on a weighting scheme for determining when to command deployment of the flap between a stowed position and a deployed position,
wherein the weighting scheme includes a first weighting factor assigned to a first sensor of the sensor system and a second weighting factor assigned to a second sensor of the sensor system,
wherein the second weighting factor is lower than the first weighting factor,
wherein the control module is programmed to assign a greater amount of weight to the sensor data from the first sensor compared to the sensor data from the second sensor when determining when to command the deployment of the flap.

7. The deployable splash guard system as recited in claim 6, wherein, in the deployed position, the flap is positioned within a spray field of a tire of the motor vehicle and is therefore positioned to block a door handle of the motor vehicle from road spray.

8. The deployable splash guard system as recited in claim 6, wherein the control module is further programmed to command the deployment of the flap when a sum of the first weighting factor and the second weighting factor exceeds a predefined value, thereby indicating a likelihood for road spray.

9. The deployable splash guard system as recited in claim 6, comprising an actuator configured to rotate the flap between the stowed position and the deployed position.

10. The deployable splash guard system as recited in claim 9, wherein the actuator is an electric motor that includes a gearbox and a drive shaft operably coupled to the gearbox, and further wherein the drive shaft is configured to rotate the flap about a pivot axis.

11. The deployable splash guard system as recited in claim 9, wherein the actuator is mounted to an inner surface of a wheel lip of the motor vehicle.

12. The deployable splash guard system as recited in claim 11, wherein the wheel lip is mounted to a fender of the motor vehicle and at least partially envelops a tire of the motor vehicle.

13. The deployable splash guard system as recited in claim 11, wherein the flap is curved to match a curvature of the inner surface of the wheel lip.

14. The deployable splash guard system as recited in claim 6, wherein the flap includes a front face that exhibits an aerodynamic sweep.

15. The deployable splash guard system as recited in claim 6, wherein the flap includes a front face having a plurality of ridges.

* * * * *